United States Patent
Zhao et al.

(10) Patent No.: US 11,509,166 B2
(45) Date of Patent: Nov. 22, 2022

(54) MICROGRID CONTROL SYSTEM AND MICROGRID

(71) Applicant: BEIJING ETECHWIN ELECTRIC CO., LTD., Beijing (CN)

(72) Inventors: Shuaiyang Zhao, Beijing (CN); Yunhai Lan, Beijing (CN); Chengzhi Qin, Beijing (CN)

(73) Assignee: BEIJING ETECHWIN ELECTRIC CO., LTD., Beijing (CN)

( * ) Notice: Subject to any disclaimer, the term of this patent is extended or adjusted under 35 U.S.C. 154(b) by 306 days.

(21) Appl. No.: 16/764,865

(22) PCT Filed: Apr. 8, 2018

(86) PCT No.: PCT/CN2018/082127
§ 371 (c)(1),
(2) Date: May 17, 2020

(87) PCT Pub. No.: WO2019/127969
PCT Pub. Date: Jul. 4, 2019

(65) Prior Publication Data
US 2020/0287410 A1    Sep. 10, 2020

(30) Foreign Application Priority Data
Dec. 28, 2017    (CN) .......................... 201711458027.5

(51) Int. Cl.
*H02J 3/32*    (2006.01)
*H02J 13/00*    (2006.01)
(Continued)

(52) U.S. Cl.
CPC ........ *H02J 13/00032* (2020.01); *G05B 11/36* (2013.01); *H02H 1/0007* (2013.01);
(Continued)

(58) Field of Classification Search
CPC .............................. H02J 3/388; H02J 7/00032
See application file for complete search history.

(56) References Cited

U.S. PATENT DOCUMENTS 5,111,377 A * 5/1992 Higasa ...................... H02J 3/38
                                                                    363/95
8,421,270 B1    4/2013 Miller et al.
(Continued)

FOREIGN PATENT DOCUMENTS

CN    105790273 A    7/2016
CN    106253268 A    12/2016
(Continued)

OTHER PUBLICATIONS

Supplementary European Search Report issued in corresponding European Application No. 18893524.1-1202, dated Nov. 3, 2020, 10 pages.
(Continued)

*Primary Examiner* — Alex Torres-Rivera
(74) *Attorney, Agent, or Firm* — Bayes PLLC

(57) ABSTRACT

Provided in the present invention are a microgrid control system and a microgrid, the microgrid control system comprising: a grid-connected switch, an energy router, a first controller and a second controller; the first controller controls the grid-connected switch and sends a first control instruction; the second controller receives the first control instruction and responds to the first control instruction for controlling the energy router.

18 Claims, 9 Drawing Sheets

(51) Int. Cl.
*G05B 11/36* (2006.01)
*H02H 1/00* (2006.01)
*H02H 7/28* (2006.01)
*H02J 3/18* (2006.01)

(52) U.S. Cl.
CPC ................ *H02H 7/28* (2013.01); *H02J 3/18* (2013.01); *H02J 3/32* (2013.01)

(56) References Cited

U.S. PATENT DOCUMENTS

| | | | |
|---|---|---|---|
| 10,205,317 B2* | 2/2019 | Sharma | H02J 3/383 |
| 2015/0145328 A1* | 5/2015 | Ohshima | H02J 3/385 |
| | | | 307/29 |
| 2017/0005473 A1 | 1/2017 | Somani et al. | |

FOREIGN PATENT DOCUMENTS

| | | |
|---|---|---|
| CN | 106532749 A | 3/2017 |
| CN | 106786777 A | 5/2017 |
| JP | 2009065778 A | 3/2009 |
| WO | 104410097 A | 3/2015 |
| WO | 2017/004125 A1 | 1/2017 |

OTHER PUBLICATIONS

Examination Report No. 1 issued in corresponding Australian Application No. 2018393156, dated Nov. 6, 2020, 4 pages.
International Search Report and Written Opinion in corresponding PCT Application No. PCT/CN2018/082127, dated Aug. 22, 2018, 9 pages.
First Office action issued in corresponding Chinese Application No. 201711458027.5, dated Jan. 2, 2020, 20 pages.

* cited by examiner

MICROGRID CONTROL SYSTEM AND MICROGRID

CROSS-REFERENCE TO RELATED APPLICATIONS

The present application is the US national phase of International Application No. PCT/CN2018/082127, filed on Apr. 8, 2018, which claims the benefits of priority to Chinese Patent Application No. 201711458027.5, filed on Dec. 28, 2017. The entire contents of each of the above-identified applications are incorporated herein by reference.

FIELD

The present disclosure generally relates to a microgrid, and specifically relates to a control system of a microgrid and a microgrid.

BACKGROUND

With the development of new electric power technology, people introduce a microgrid structure to adjust an external power grid, which is beneficial to an interconnection of distributed power supply and large scale access of the distributed power supply to medium and low voltage distribution systems. A microgrid is a group of system units comprising a control device, an energy storage device, a load and a micro power, to supply power to the load. The microgrid can be operated in a state of grid-connected with an external power grid or in isolation.

However, a real-time performance of the existing microgrid depends on communication and response speeds of downstream devices, and operation stability of the microgrid system is poor and needs to be improved.

SUMMARY

An object of the present disclosure is to provide a control system of a microgrid and a microgrid, which enhance operation stability of the microgrid by hierarchical control.

A control system of a microgrid is provided according to one aspect of the present disclosure, the control system of the microgrid includes a grid-connection switch, an energy router, a first controller and a second controller. The first controller controls connection and disconnection of the grid-connection switch and sends a first control instruction based on a state of the control system of the microgrid. The second controller receives the first control instruction from the first controller and controls the energy router in response to the first control instruction.

A microgrid is provided according to another aspect of the present disclosure, which includes the control system of the microgrid described above, an energy storage unit and a load. The energy storage unit is connected to an end of the energy router, and the other end of the energy router is connected to a power grid via the grid-connection switch. The energy router supplies power to the load. The energy storage unit and the grid-connection switch are connected to the first controller via an optical network. The energy router is connected to the second controller via an optical network, and the second controller is connected to the first controller via an optical network. In a case that the microgrid system is in an off-grid state, the control system of the microgrid converts a direct current of the energy storage unit into an alternating current, for supplying to the load. In a case that the microgrid system is in a grid-connected state, the control system of the microgrid converts an alternating current of the power grid into a direct current, for charging the energy storage unit.

The control system of the microgrid and the microgrid of the present disclosure enhance the operation stability of the microgrid by hierarchical control, and achieve an ability of applying 100% unbalanced load in an off-grid state by double closed loop control of voltage and current.

BRIEF DESCRIPTION OF THE DRAWINGS

The above and other objects, characteristics and advantages will be more clear according to following detailed descriptions in conjunction with drawings, wherein.

DETAILED DESCRIPTION

Figure 1:
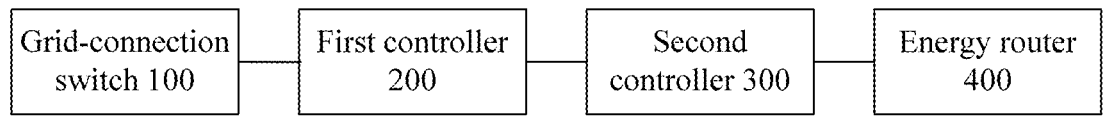
FIG. 1 is a block diagram of a control system of a microgrid according to an embodiment of the present disclosure.

Various exemplary embodiments of the present disclosure are fully described hereinafter in conjunction with drawings, and some of the exemplary embodiments are illustrated in the drawings.

A control system of a microgrid and a microgrid according to embodiments of the present disclosure are described hereinafter by referring to FIG. 1 to FIG. 17.

Figure 2:
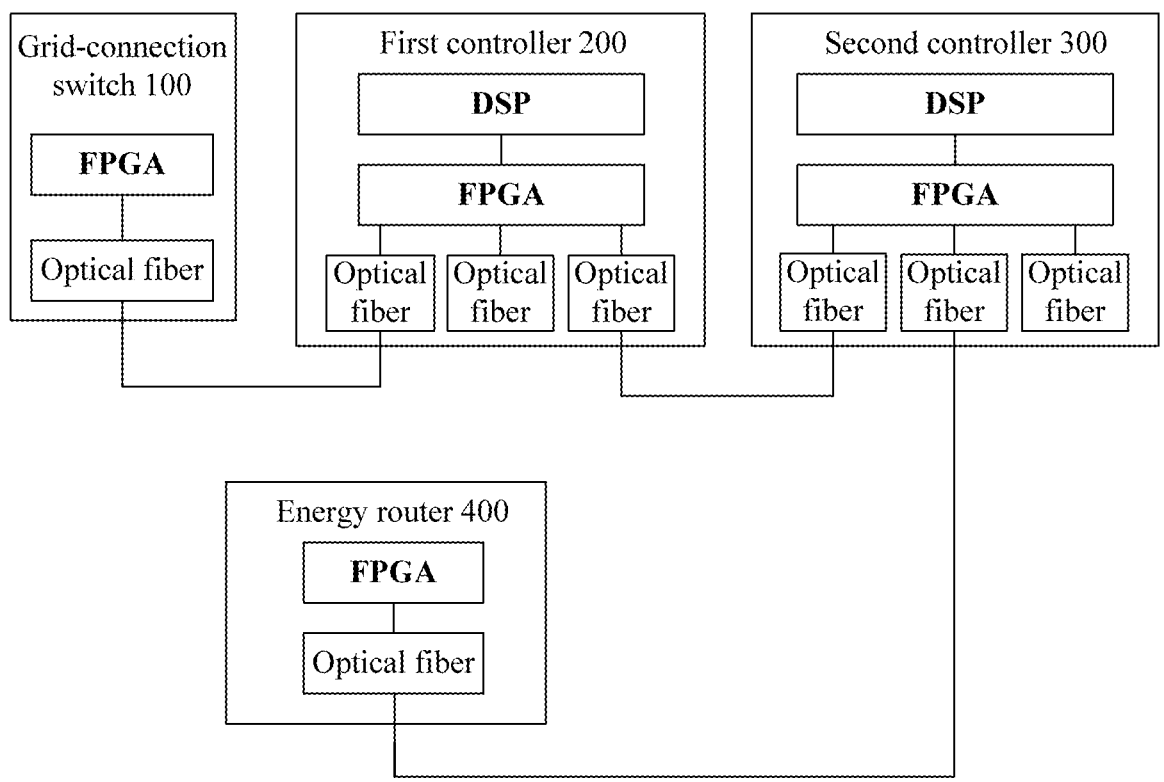
FIG. 2 is a hardware connection diagram of a control system of a microgrid according to an embodiment of the present disclosure.

As illustrated in FIG. 1 and FIG. 2, the control system of the microgrid according to an embodiment of the present disclosure includes a grid-connection switch 100, a first controller 200, a second controller 300 and an energy router 400. The grid-connection switch 100, the first controller 200, the second controller 300 and the energy router 400 are communicated via optical fibers. Here, a fiber optic communication protocol may be a custom private protocol, to maximize real-time performance. As an example, fiber optic communication coding and decoding may be performed by a field programmable gate array (FPGA).

The first controller 200 controls connection and disconnection of the grid-connection switch 100 and sends a first control instruction based on a state of the control system of the microgrid. The second controller 300 receives the first control instruction from the first controller 200, and controls the energy router 400 in response to the first control instruction.

It should be understood that when the grid-connection switch 100 is connected, the control system of the microgrid is in a grid-connected state, and when the grid-connection switch 100 is disconnected, the control system of the microgrid is in an off-grid state.

Here, the second controller 300 includes a digital signal processor (DSP). The second controller 300 may be configured to be in a VSG control mode when the digital signal processor runs a VSG algorithm, and in a PQ control mode when the digital signal processor runs a PQ algorithm.

It should be understood that the first controller 200 may also include a digital signal processor to apply a control algorithm.

Preferably, data exchange may be performed by the field programmable gate array and the digital signal processor.

In an embodiment, when the grid-connection switch 100 is disconnected, the first controller 200 generates a first frequency regulation instruction and a first voltage regulation instruction based on actual voltage and frequency of the power grid, determines a first active power instruction and a first reactive power instruction based on a three-phase voltage of the power grid and a three-phase voltage of the microgrid, and takes the first frequency regulation instruction, the first voltage regulation instruction, the first active power instruction and the first reactive power instruction as the first control instruction; the second controller 300 is in the VSG (virtual synchronous generator) control mode.

That is to say, when the grid-connection switch 100 is disconnected, the control system of the microgrid is in the off-grid state, and the first controller 200 takes the first frequency regulation instruction, the first voltage regulation instruction, the first active power instruction and the first reactive power instruction as the first control instruction to send. The second controller 300 is in the VSG control mode, and controls the energy router 400 in response to the received first control instruction.

A control process of the first controller 200 in the off-grid state is described in detail hereinafter.

The first controller 200 determines a voltage amplitude $U_{outg}$ of the power grid and an angular frequency of the power grid, takes the voltage amplitude $U_{outg}$ of the power grid as the first voltage regulation instruction $U_{ref}$, and takes the angular frequency of the power grid as the first frequency regulation instruction $\omega_{ref}$. In addition, the first controller 200 further determines the frequency $F_{reqg}$ of the power grid, the frequency $F_{reqm}$ of the microgrid and the voltage amplitude $U_{outm}$ of the microgrid; performs PI (Proportional Integral) adjustment on a difference between the frequency $F_{reqg}$ of the power grid and the frequency $F_{reqm}$ of the microgrid and determines the difference after the PI adjustment as the first active power instruction $P_{ref}$; and performs PI adjustment on a difference between the voltage amplitude $U_{outg}$ of the power grid and the voltage amplitude $U_{outm}$ of the microgrid and determines the difference after the PI adjustment as the first reactive power instruction $Q_{ref}$.

Here, the above two PI adjustments simulate processes of voltage regulation and frequency regulation of a synchronous generator, cause the voltage amplitude and the frequency outputted by the microgrid to be consistent with the voltage amplitude and the frequency outputted by the power grid and cause a voltage phase outputted by the microgrid and a voltage phase outputted by the power grid to be inconsistent in the off-grid state.

Preferably, the first controller 200 collects the three-phase voltage of the power grid, calculates the voltage amplitude $U_{outg}$ of the power grid, the frequency $F_{reqg}$ of the power grid and the voltage phase Thetag of the power grid through a software phase-locked loop (PLL), and determines a product of $2\pi$ and the frequency $F_{reqg}$ of the power grid as the angular frequency of the power grid.

Preferably, the first controller 200 collects the three-phase voltage of the power grid, calculates the voltage amplitude $U_{outm}$ of the microgrid, the frequency $F_{reqm}$ of the microgrid and the voltage phase Thetag of the microgrid through a software phase-locked loop.

A control process of the second controller 300 in the off-grid state is described in detail hereinafter.

The second controller 300 receives the first voltage regulation instruction $U_{ref}$ and the first frequency regulation instruction $\omega_{ref}$ and controls the energy router 400 in response to the first voltage regulation instruction $U_{ref}$ and the first frequency regulation instruction $\omega_{ref}$ to make the voltage amplitude and the frequency outputted by the microgrid consistent with the voltage amplitude and the frequency outputted by the power grid. In addition, the second controller 300 receives the first active power instruction $P_{ref}$ and the first reactive power instruction $Q_{ref}$, and controls the energy router 400 in response to the first active power instruction $P_{ref}$ and the first reactive power instruction $Q_{ref}$, to make the energy router 400 output an active power and a reactive power that match the load.

Figure 3:
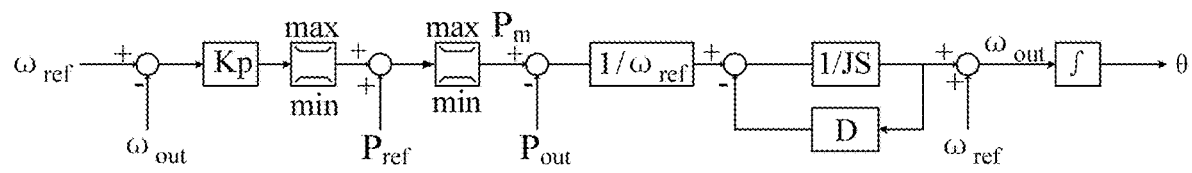
FIG. 3 is a schematic diagram of determining angles of a positive sequence rotation coordinate transformation and a negative sequence rotation coordinate transformation of an output voltage and an output current of an energy router according to an embodiment of the present disclosure.

As illustrated in FIG. 3, the second controller 300 determines an actual output active power $P_{out}$ and an actual output reactive power $Q_{out}$ based on an output voltage of the energy router 400 (i.e., an output voltage of the microgrid), and determines angles θ of a positive sequence rotation coordinate transformation and a negative sequence rotation coordinate transformation of the output voltage and the output current of the energy router 400 by invoking a rotor motion equation and an original mover regulation equation in combination with the actual output active power $P_{out}$, the first active power instruction $P_{ref}$ and the first frequency regulation instruction $\omega_{ref}$.

Figure 4:
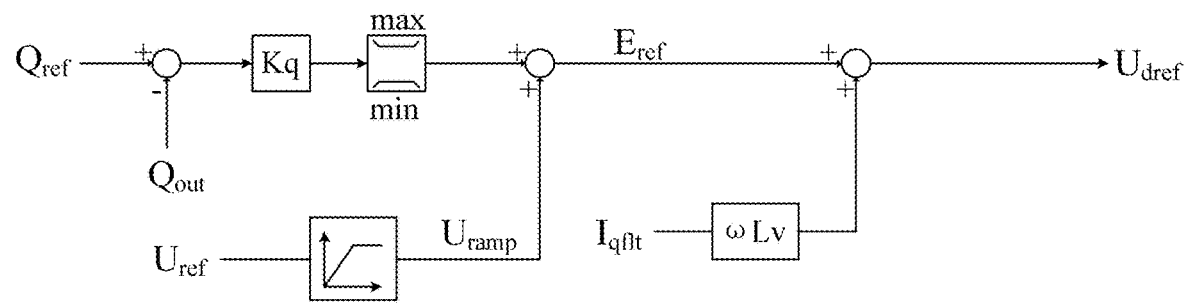
FIG. 4 is a schematic diagram of determining a d axis component given value of a positive sequence output voltage of an energy router according to an embodiment of the present disclosure.
Figure 5:
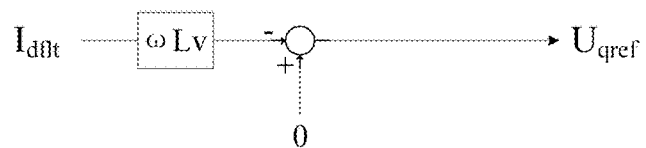
FIG. 5 is a schematic diagram of determining a q axis component given value of a positive sequence output voltage of an energy router according to an embodiment of the present disclosure.

As illustrated in FIG. 4 and FIG. 5, the second controller 300 determines d axis and q axis component given values $U_{dref}$, $U_{qref}$ of the positive sequence output voltage of the energy router 400 based on the actual output reactive power $Q_{out}$, the first reactive power instruction $Q_{ref}$ and the first voltage regulation instruction $U_{ref}$, and sets d axis and q axis component given values of the negative sequence output voltage of the energy route 400 as zero.

Figure 6:
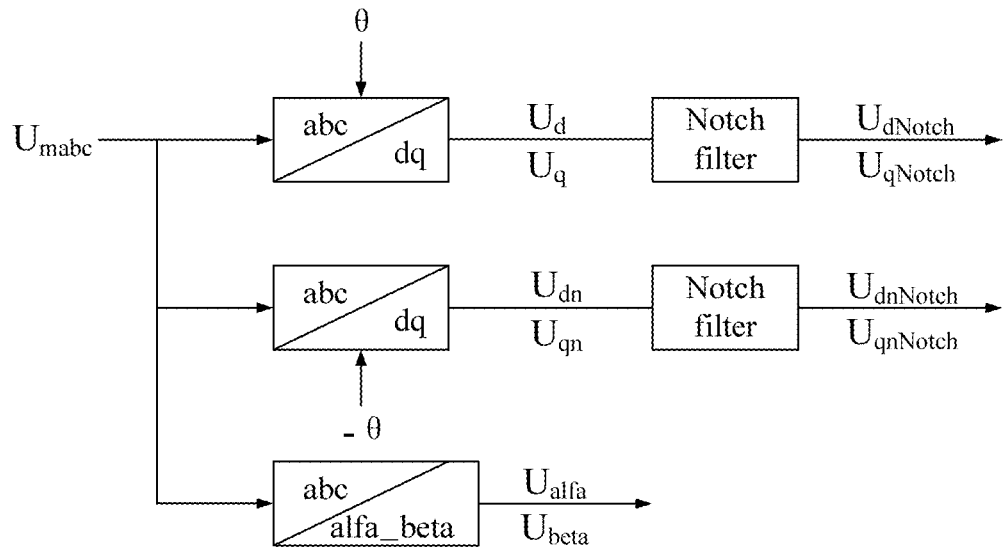
FIG. 6 is a schematic diagram of determining direct current components of a positive sequence component and a negative sequence component of an output voltage according to an embodiment of the present disclosure.
Figure 7:
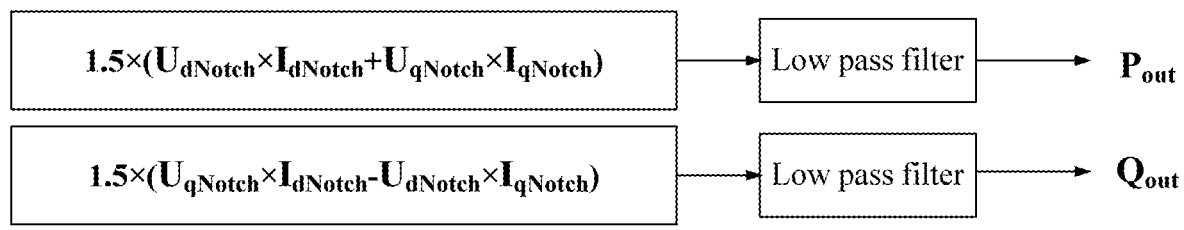
FIG. 7 is a schematic diagram of determining an actual output active power and an actual output reactive power according to an embodiment of the present disclosure.
Figure 8:
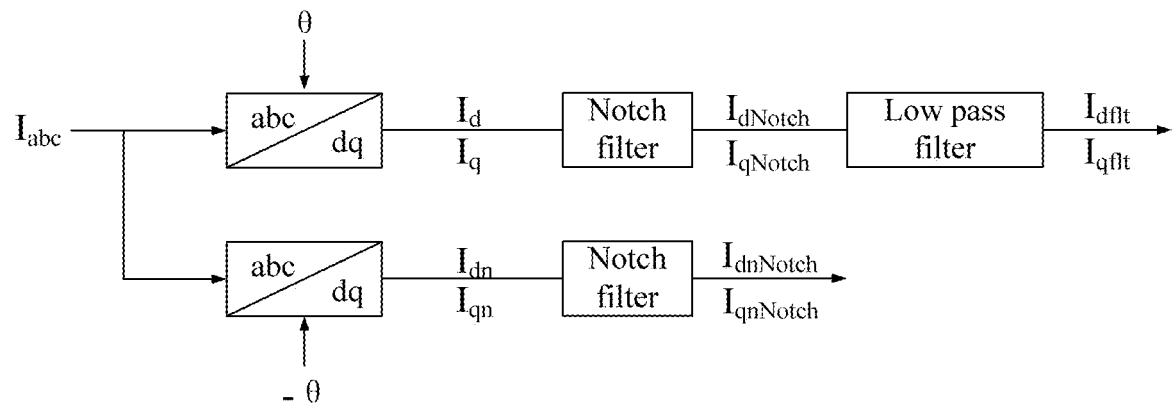
FIG. 8 is a schematic diagram of determining direct current components of a positive sequence component and a negative sequence component of an output current according to an embodiment of the present disclosure.

As illustrated in FIG. 6, FIG. 7 and FIG. 8, the second controller 300 is configured to: perform a positive sequence rotation coordinate transformation and a negative sequence rotation coordinate transformation on the output voltage of the energy router 400 to obtain positive sequence components $U_d$, $U_q$ and negative sequence components $U_{dn}$, $U_{qn}$ of the output voltage; obtain direct current components $U_{dNotch}$, $U_{qNotch}$ of the positive sequence components $U_d$, $U_q$ and direct current components $U_{dnNotch}$, $U_{qnNotch}$ of the negative sequence components $U_{dn}$, $U_{qn}$ of the output voltage by a notch filter; perform a positive sequence rotation coordinate transformation and a negative sequence rotation coordinate transformation on the output current of the energy router 400 to obtain positive sequence components $I_d$, $I_q$ and negative sequence components $I_{dn}$, $I_{qn}$ of the output current; obtain direct current components $I_{dNotch}$, $I_{qNotch}$ of the positive sequence components $I_d$, $I_q$ and direct current components $I_{dnNotch}$, $I_{qnNotch}$ of the negative sequence components $I_{dn}$, $I_{qn}$ of the output current by a notch filter; calculate an instantaneous active power and an instantaneous reactive power of the energy router 400 based on the direct current components $U_{dNotch}$, $U_{qNotch}$, $U_{dnNotch}$, $U_{qnNotch}$ of the positive sequence component and the negative sequence component of the output voltage and the direct current components $I_{dNotch}$, $I_{qNotch}$, $I_{dnNotch}$, $I_{qnNotch}$ of the positive sequence component and the negative sequence component of the output current; and pass the instantaneous active power and the instantaneous reactive power through a low pass filter (LPF) to obtain the actual output active power $P_{out}$ and the actual output reactive power $Q_{out}$.

Figure 9:
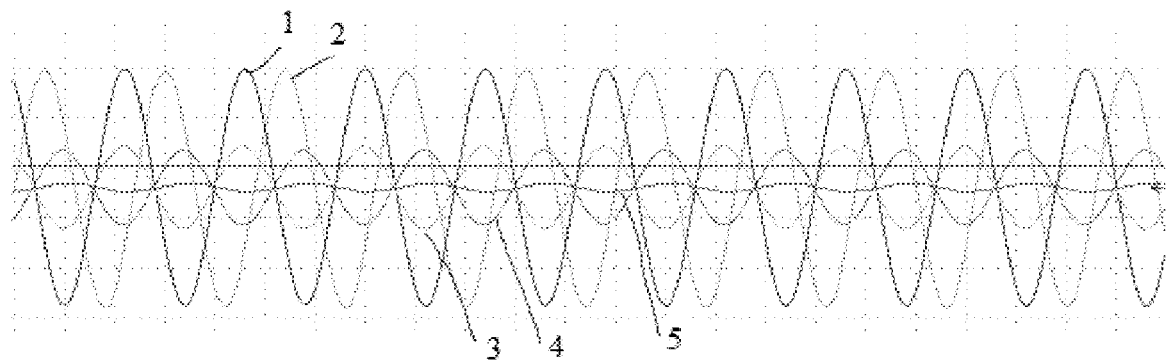
FIG. 9 illustrates a waveform of an experiment of applying an unbalanced load in a VSG control mode according to an embodiment of the present disclosure.

Preferably, in order to suppress unbalanced output voltage caused by unbalanced load, the second controller 300 is further configured to: pass the positive sequence components $U_d$, $U_q$ and the negative sequence components $U_{dn}$, $U_{qn}$ of the output voltage through a notch filter with a center frequency being twice times of the output frequency, to obtain the direct current components $U_{dNotch}$, $U_{qNotch}$ of the positive sequence components $U_d$, $U_q$ of the output voltage and direct current components $U_{dnNotch}$, $U_{qnNotch}$ of the negative sequence components $U_{dn}$, $U_{qn}$ of the output voltage. FIG. 9 is a waveform of an experiment of applying an unbalanced load in the VSG control mode according to an embodiment of the present disclosure. As illustrated in FIG. 9, curve 1 is a line voltage $U_{ab}$ outputted by the energy router 400, curve 2 is a line voltage $U_{bc}$ outputted by the energy router 400, and curves 3, 4, 5 are three phase currents $I_a$, $I_b$, $I_c$ outputted by the energy router 400, respectively. It can be known from FIG. 9 that the technology solution may control the output voltage to be balanced under the off-grid state when applying an unbalanced load, without being affected by the unbalanced load, thus verifying correction of the control algorithms.

Herein, the instantaneous active power may be calculated by following equation:

$$1.5 \times (U_{dNotch} \times I_{dNotch} + U_{qNotch} \times I_{qNotch})$$

where $U_{dNotch}$ is the d axis direct current component of the positive sequence component of the output voltage, $U_{qNotch}$ is the q axis direct current component of the positive sequence component of the output voltage, $I_{dNotch}$ is the d axis direct current component of the positive sequence component of the output current, and $I_{qNotch}$ is the q axis direct current component of the positive sequence component of the output current.

The instantaneous reactive power may be calculated by following equation:

$$1.5 \times (U_{qNotch} \times I_{dNotch} - U_{dNotch} \times I_{qNotch})$$

It should be understood that the second controller 300 passes the instantaneous active power and the instantaneous reactive power through the low pass filter to obtain the actual output active power $P_{out}$ and the actual output reactive power $Q_{out}$, thereby improving stability of the VSG control mode of the second controller in the off-grid state.

Herein, the rotor motion equation is:

$$\begin{cases} J \dfrac{d\omega_{out}}{dt} = \dfrac{P_m - P_{out}}{dt} - D(\omega_{out} - \omega_{ref}) \\ \dfrac{d\theta}{dt} = (\omega_{out} - \omega_{ref}) \end{cases}$$

where $\omega_{ref}$ is the first frequency regulation instruction, $\omega_{out}$ is the angular frequency of the output voltage, $P_{out}$ is the actual output active power, $P_m$ is a virtual mechanical power given value of the VSG, J is a virtual rotational inertia, D is a virtual damping factor, $\theta$ is the angle of positive sequence rotation coordinate transformation and negative sequence rotation coordinate transformation of the output voltage and the output current of the energy router 400.

The prime mover regulation equation is:

$$P_m = P_{ref} + K_p(\omega_{ref} - \omega_{out})$$

where $P_{ref}$ is the first active power instruction, $K_p$ is an active power difference coefficient, $P_m$ is the virtual mechanical power given value of the VSG, which consists of the first active power instruction and an adjustment power outputted by a virtual governor based on an angular frequency deviation, and is provided by simulating a prime mover of a synchronous machine via a distributed power supply and an energy storage unit.

Voltage regulating of the second controller 300 in the VSG control mode is simulating a reactive voltage sag relationship of the synchronous generator to obtain a VSG output voltage, as shown in following equation:

$$E_{ref} = K_q(Q_{ref} - Q_{ref}) + U_{ref}$$

$E_{ref}$ is the VSG output voltage, $U_{ref}$ is the first voltage regulation instruction, $Q_{ref}$ is the first reactive power instruction, $Q_{out}$ is the actual output reactive power, and $K_q$ is a reactive power difference coefficient.

In order to stabilize a parallel operation of multi-machine, a virtual impedance $\omega L_v$ is added, such that the d axis and q axis component given values $U_{dref}$, $U_{qref}$ of the positive sequence output voltage of the energy router 400 may be determined by following equation:

$$\begin{cases} U_{dref} = E_{ref} + \omega L_V I_{qflt} \\ U_{qref} = -\omega L_V I_{dflt} \end{cases}$$

In order to achieve applying an unbalance load in the off-grid state, the d axis and q axis component given values of the negative sequence output voltage of the energy route 400 are set as zero.

Figure 10:
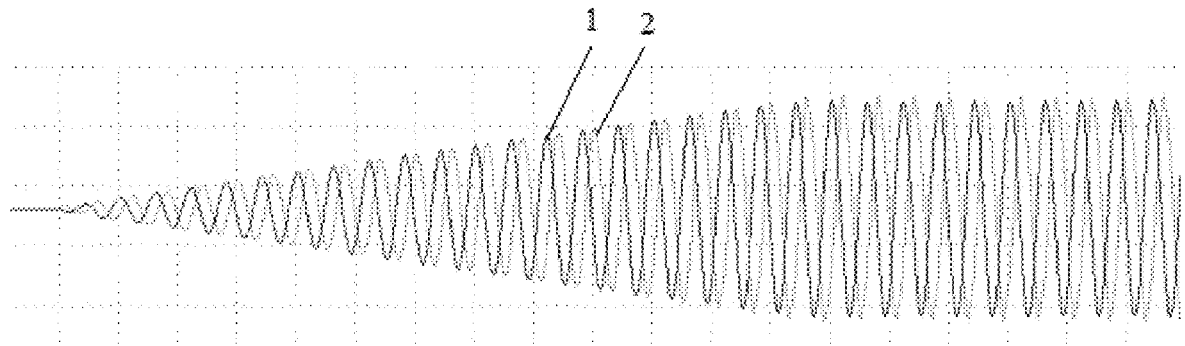
FIG. 10 illustrates a waveform of an experiment of black-start of an energy router according to an embodiment of the present disclosure.

To enable the energy router 400 have an off-grid black start function, the second controller 300 invokes a ramp function to add the first voltage regulation instruction $U_{ref}$ to an output of a reactive power deviation regulation to realize a function of stepping up from zero, to gradually increase the output voltage of the energy router (i.e., the output voltage of the microgrid) from zero to a preset value. FIG. 10 is a waveform of an experiment of black-start of the energy router according to an embodiment of the present disclosure. As illustrated in FIG. 10, curve 1 is the line voltage $U_{ab}$ outputted by the energy router 400, and curve 2 is the line voltage $U_{bc}$ outputted by the energy router 400. It can be known from FIG. 10 that the voltage of the microgrid is gradually increased from zero to a given voltage, thereby reducing an magnetizing inrush current of a distribution transformer and ensuring stability of the frequency and voltage of the microgrid.

Figure 11:
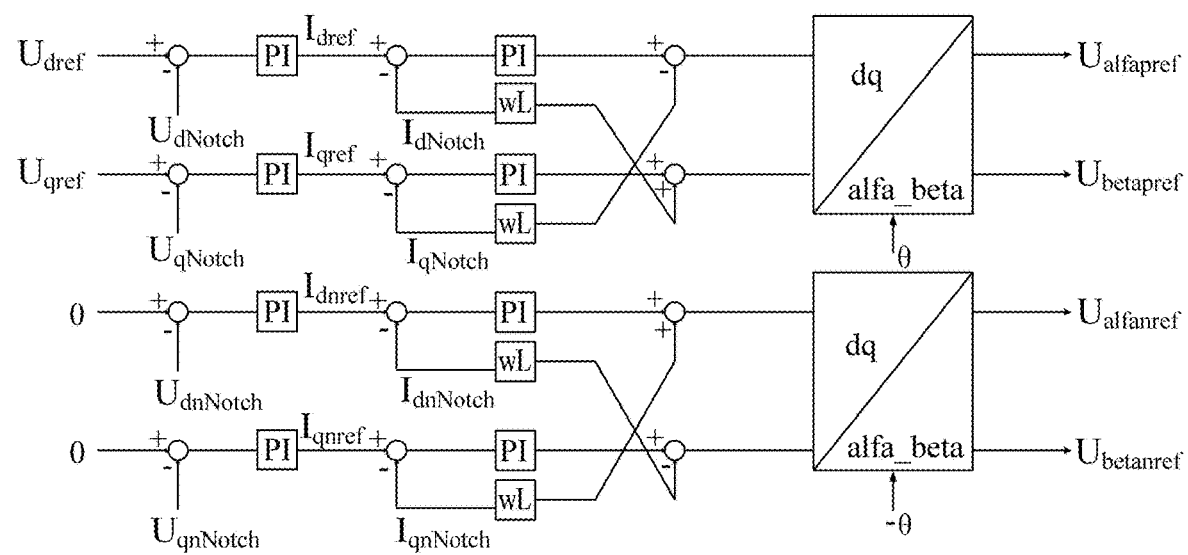
FIG. 11 is a schematic diagram of determining a positive sequence output voltage component given value and a negative sequence output voltage component given value of an energy router in a static coordinate system according to an embodiment of the present disclosure.

As illustrated in FIG. 11, the second controller 300 is further configured to: perform PI adjustment on differences between the d axis component given value and q axis component given value of a positive sequence output voltage and a negative sequence output voltage of the energy router 400 and the direct current components $U_{dNotch}$, $U_{qNotch}$, $U_{dnNotch}$, $U_{qnNotch}$ of the positive sequence component and the negative sequence component of the output voltage, and takes the differences after the PI adjustment as the positive sequence and negative sequence output current component given values $I_{dref}$, $I_{qref}$, $I_{dnref}$, $I_{gnref}$ of the energy router 400; determines positive sequence and negative sequence output voltage component given values $U_{alfapref}$, $U_{betapref}$, $U_{alfanref}$, $U_{betanref}$ of the energy router 400 in the static coordinate system based on differences between the positive sequence and negative sequence output current component given values $I_{dref}$, $I_{qref}$, $I_{dnref}$, $I_{qnref}$ of the energy router 400 and the direct current components $I_{dNotch}$, $I_{qNotch}$, $I_{dnNotch}$, $I_{qnNotch}$ of the positive sequence and negative sequence components of the output current after the PI adjustment, to realize double closed loop control of voltage and current and thus realize applying 100% unbalance load in the off-grid state.

Preferably, the second controller 300 controls differences between the positive sequence and negative sequence output current component given values $I_{dref}$, $I_{qref}$, $I_{dnref}$, $I_{qnref}$ of the energy router 400 and the direct current components $I_{dNotch}$, $I_{qNotch}$, $I_{dnNotch}$, $I_{qnNotch}$ of the positive sequence and negative sequence components of the output current to suffer a PI adjustment, an addition of a voltage coupling term generated by an electric reactor and an inverse transformation, to obtain the positive sequence and negative sequence output voltage component given values $U_{alfapref}$, $U_{betapref}$, $U_{alfanref}$, $U_{betanref}$ of the energy router 400 in the static coordinate system.

In a case of applying a nonlinear load in an off-grid state, odd harmonics will be contained in the output voltage of the energy router 400 if harmonic suppression is not performed, which will result in overproof of harmonic distortion THD of the output voltage and thus requirement on power quality of powering a sensitive load cannot be met. Therefore, the second controller 300 detects the odd harmonics in the output voltage of the energy router 400, determines a direct current component of each of the harmonic voltages, performs PI adjustment on difference between the direct current component of each of the harmonic voltages and zero, and performs inverse transform on the differences after the PI adjustment to obtain a given value of each of the harmonic voltages $U_{alfahref}$, $U_{betahref}$ to suppress harmonics in the output voltage of the energy router 400.

As an example, in a case of applying an uncontrolled rectifier nonlinear load in an off-grid state, the active power is 90 kW, the reactive power is 30 kW. If there is no harmonic suppression, content of fifth harmonic contained in the output voltage of the energy router 400 calculated by FFT is 6.7%, content of seventh harmonic is 3.5%, content of eleventh harmonic is 2.2%, and content of thirteenth harmonic is 1.8%. If harmonic suppression is performed, content of fifth harmonic contained in the output voltage of the energy router 400 calculated by FFT is 0.23%, content of the seventh harmonic is 0.14%, content of the eleventh harmonic is 0.10%, and content of the thirteenth harmonic is 0.08%. Therefore, the fifth, seventh, eleventh and thirteenth harmonics in the output voltage of the power router 400 are well suppressed, and thus effectiveness of the harmonic suppression control algorithm is verified.

Figure 12:
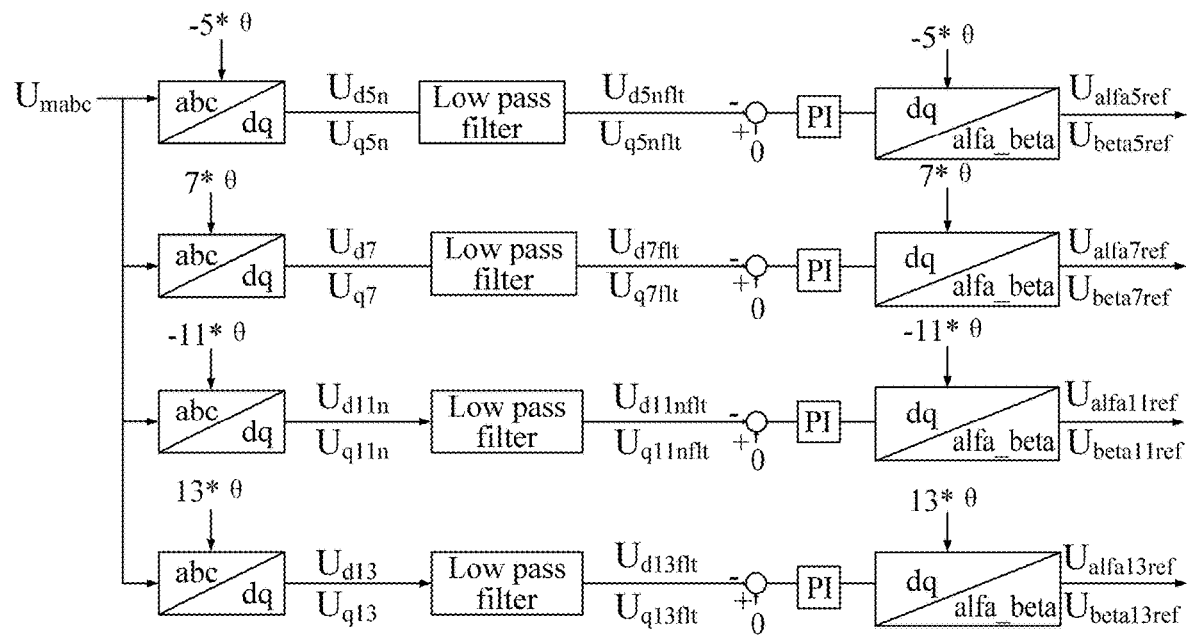
FIG. 12 is a schematic diagram of obtaining a given value of each harmonic voltage according to an embodiment of the present disclosure.

As illustrated in FIG. 12, the second controller 300 detects the fifth, seventh, eleventh and thirteenth harmonics in the output voltage of the power router 400, and performs rotation coordinate transformation on the output voltage of the energy router 400 to obtain the corresponding harmonic components. It should be understood that in a general balanced load application, the fifth and eleventh harmonics appear as negative sequence components, and the seventh and thirteenth harmonics appear as positive sequence components. Therefore, negative sequence rotation coordinate transformation with rotation angles of −5×θ and −11×θ are respectively performed on the fifth and eleventh harmonics, and positive sequence rotation coordinate transformation with rotation angles of 7×θ and 13×θ are respectively performed on the seventh and thirteenth harmonics, to obtain the corresponding harmonic components. Then, the second controller 300 passes the harmonic component through the low pass filter to obtain direct current component of the harmonic current, performs PI adjustment on differences between the direct current component of each harmonic voltage and zero, and performs inverse transform on the differences after the PI adjustment to obtain the given value of each harmonic voltage ($U_{alfahref}$, $U_{betahref}$ (h=5, 7, 11, 13)).

Figure 13:
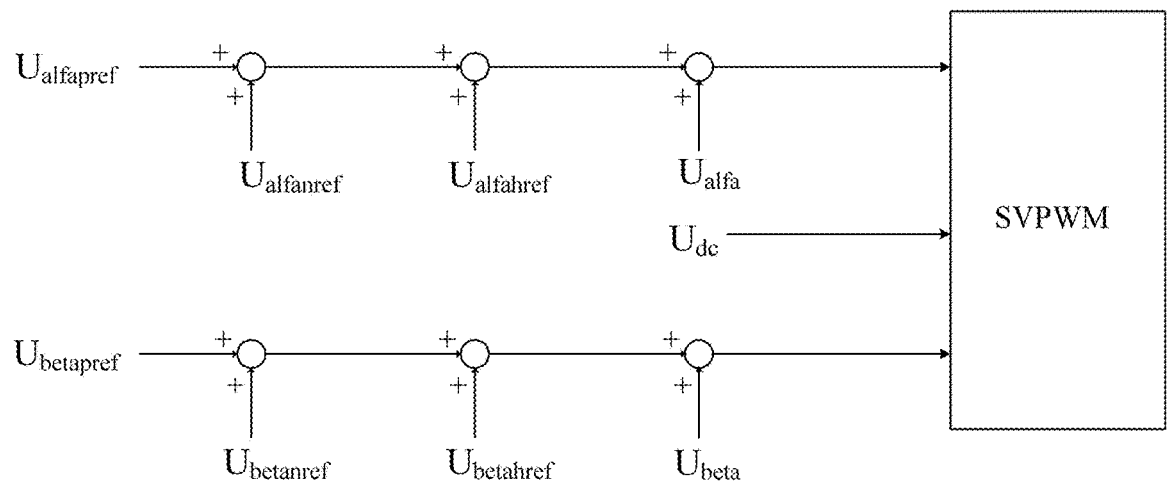
FIG. 13 is a schematic diagram of generating a modulated wave according to an embodiment of the present disclosure.

As illustrated in FIG. 13, the second controller 300 obtains feedforward amounts $U_{alfa}$, $U_{beta}$ of the output voltage by performing a static coordinate transformation on the output voltage of the energy router 400, and generates a modulated wave by invoking an SVPWM (space vector pulse width modulation) modulation wave generation function in combination with a sum of the positive sequence and negative sequence output voltage component given values $U_{alfapref}$, $U_{betapref}$, $U_{alfanref}$, $U_{betanref}$ in the static coordinate system, each harmonic voltage given values $U_{alfapref}$, $U_{betapref}$ and the feedforward amounts $U_{alfa}$, $U_{beta}$ of the output voltage, to control operation of the energy router 400.

In another embodiment, when the grid-connection switch 100 is disconnected, the first controller 200 determines the voltage amplitude $U_{outg}$ of the power grid, the voltage phase Thetag of the power grid, the voltage phase Thetam of the microgrid and an angular frequency of the microgrid, and detects whether a difference between the voltage phase Thetag of the power grid and the voltage phase Thetam of the microgrid reaches a predetermined threshold; and the first controller 200, when detecting that the difference reaches the predetermined threshold, controls the grid-connection switch 100 to be closed, thus achieving smooth switch from the off-grid state to the grid-connected state.

Specifically, the first controller 200 superimposes a predetermined multiple of the difference onto the angular frequency of the microgrid to obtain a second frequency regulation instruction, and takes the voltage amplitude $U_{outg}$ of the power grid as the second voltage regulation instruction, and also determines a second active power instruction and a second reactive power instruction which match the load, and takes the second frequency regulation instruction, the second voltage regulation instruction, the second active power instruction and the second reactive power instruction as the first control instruction.

Preferably, the predetermined multiple is 5, which is not limited in the present disclosure.

Figure 14:
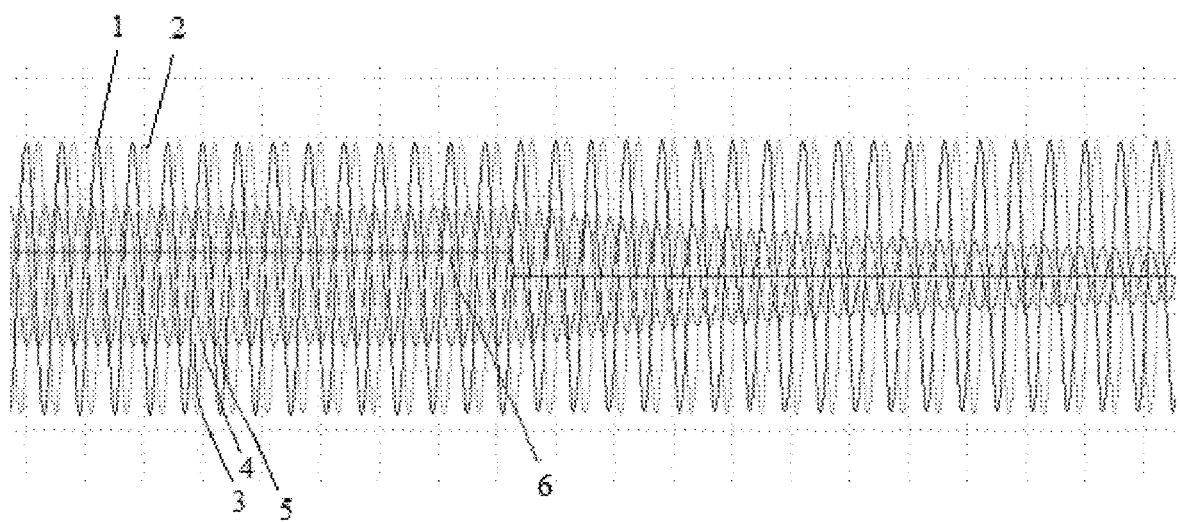
FIG. 14 is a waveform of an experiment of switching from an off-grid state to a grid-connected state according to an embodiment of the present disclosure.

As illustrated in FIG. 14, in the off-grid state, the active power is 100 kw, the reactive power is 90 kw; in the grid-connected state, the active power is 10 kw, the reactive power is 0 kw. Curves 1 and 2 are the line voltages $U_{ab}$, $U_{bc}$ outputted by the energy router 400, curves 3, 4, 5 are the three phase currents $I_a$, $I_b$, $I_c$ outputted by the energy router 400, respectively, and curve 6 is the state of the grid-connection switch 100. As illustrated in FIG. 14, when the off-grid state is switched to the grid-connected state, the voltage and current outputted by the energy router 400 are shock-free, and after grid connection the power quickly tracks active and reactive instructions of the grid-connected state.

In another embodiment, when the grid-connection switch 100 is closed, the first controller 200 generates a third active power instruction and a third reactive power instruction as the first control instruction based on a power of the load and a state of an energy storage unit; and the second controller 300 is in the PQ (active and reactive) control mode.

That is to say, when the grid-connection switch 100 is closed, the control system of the microgrid is in the grid-connected state, the first controller 200 takes the third active power instruction and the third reactive power instruction as the first control instruction to send. The second controller 300 is in the PQ control mode, and controls the energy router 400 in response to the received first control instruction.

In the grid-connected state, the second controller 300 does not perform voltage closed-loop control and voltage harmonic suppression control. Furthermore, the second controller 300 sets the negative sequence output current component given values $I_{dnref}$, $I_{qnref}$ of the energy router 400 as 0.

Figure 15:
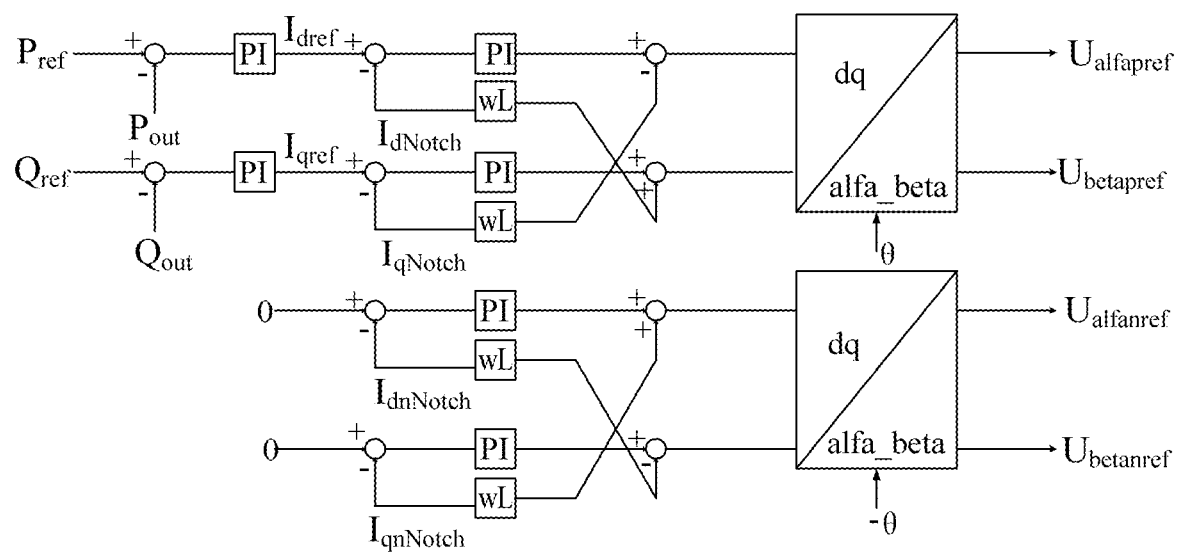
FIG. 15 is a schematic diagram of determining a positive sequence output voltage component given value and a negative sequence output voltage component given value in a static coordinate system in a grid-connected state according to an embodiment of the present disclosure.

As illustrated in FIG. 15, the second controller 300, based on the positive sequence and negative sequence output current component given values $I_{dref}$, $I_{qref}$, $I_{dnref}$, $I_{qnref}$ of the energy router 400 and the direct current components $I_{dNotch}$, $I_{qNotch}$, $I_{dnNotch}$, $I_{qnNotch}$ of the positive sequence and negative sequence components of the output current of the energy router 400, determines the positive sequence and negative sequence output voltage component given values $U_{alfapref}$, $U_{betapref}$, $U_{alfanref}$, $U_{betanref}$ in the static coordinate system, and generates a modulated wave by invoking an SVPWM modulation wave generation function in combination with a sum of the positive sequence and negative sequence output voltage component given values $U_{alfapref}$, $U_{betapref}$, $U_{alfanref}$, $U_{betanref}$ in the static coordinate system and the feedforward amounts $U_{alfa}$, $U_{beta}$ of the output voltage of the energy router 400, to control the operation of the energy router.

Specifically, the second controller 300 controls the differences between the positive sequence and negative sequence output current component given values $I_{dref}$, $I_{qref}$, $I_{dnref}$, $I_{qnref}$ of the energy router 400 and the direct current components $I_{dNotch}$, $I_{qNotch}$, $I_{dnNotch}$, $I_{qnNotch}$ of the positive sequence and negative sequence components of the output current of the energy router 400 to suffer a PI adjustment, an addition of a voltage coupling term generated by an electric reactor and an inverse transformation, to obtain the positive sequence and negative sequence output voltage component given values $U_{alfapref}$, $U_{betapref}$, $U_{alfanref}$, $U_{betanref}$ in the static coordinate system, and generates a modulated wave by invoking an SVPWM modulation wave generation function in combination with a sum of the positive sequence and negative sequence output voltage component given values $U_{alfapref}$, $U_{betapref}$, $U_{alfanref}$, $U_{betanref}$ in the static coordinate system and the feedforward amounts $U_{alfa}$, $U_{beta}$ of the output voltage of the energy router 400.

In another embodiment, the first controller 200, if detecting fault of the power grid in a case that the control system of the microgrid is in the grid-connected state, controls the grid-connection switch 100 to be disconnected.

In another embodiment, in a case that the grid-connection switch 100 is closed, the first controller 200, if detecting that a current flowing through the grid-connection switch 100 reaches a predetermined current threshold, controls the grid-connection switch 100 to be disconnected, thereby achieving smooth switching from the grid-connected state to the off-grid state.

Specifically, the first controller generates a fourth active power instruction and a fourth reactive power instruction according to the current flowing through the grid-connection switch, and then takes the four active power instruction and the fourth reactive power instruction as the first control instruction.

Figure 16:
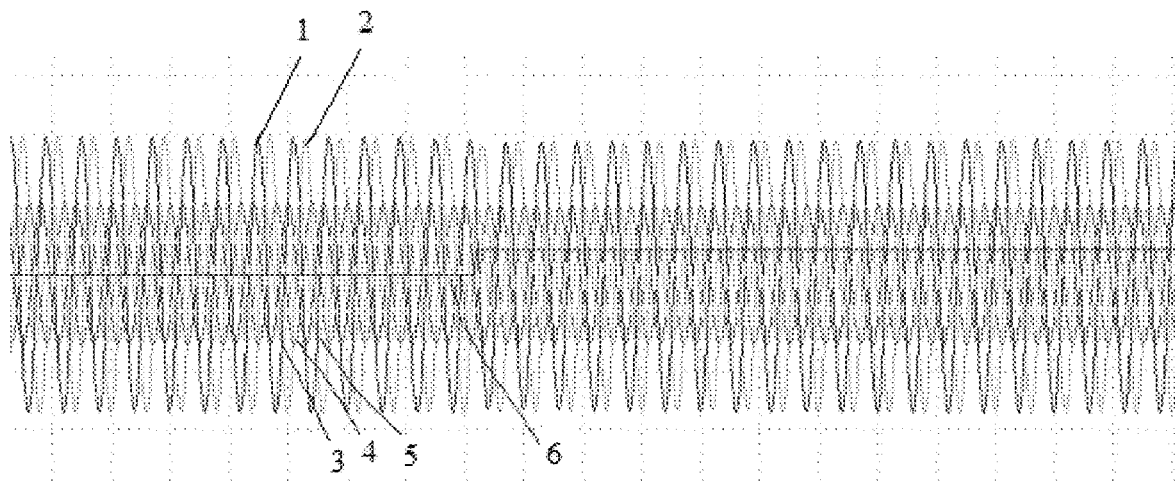
FIG. 16 is a waveform of an experiment of switching from a grid-connected state to an off-grid state according to an embodiment of the present disclosure.

As illustrated in FIG. 16, in the off-grid state, the active power is 100 kw, and the reactive power is 90 kw. Curves 1 and 2 are the line voltages $U_{ab}$, $U_{bc}$ outputted by the energy router 400, curves 3, 4, 5 are the three phase currents $I_a$, $I_b$, $I_c$ outputted by the energy router 400, and curve 6 is the state of the grid-connection switch 100. As illustrated in FIG. 16, an output power of the energy router 400 has been matched with the load before off-grid, thereby ensuring that the current flowing through the grid-connection switch 100 is small and thus the voltage and current are shock free in process of switching from the grid-connected state to the off-grid state.

The microgrid system according to the embodiments of the present disclosure is described hereinafter in conjunction with FIG. 17.

Figure 17:
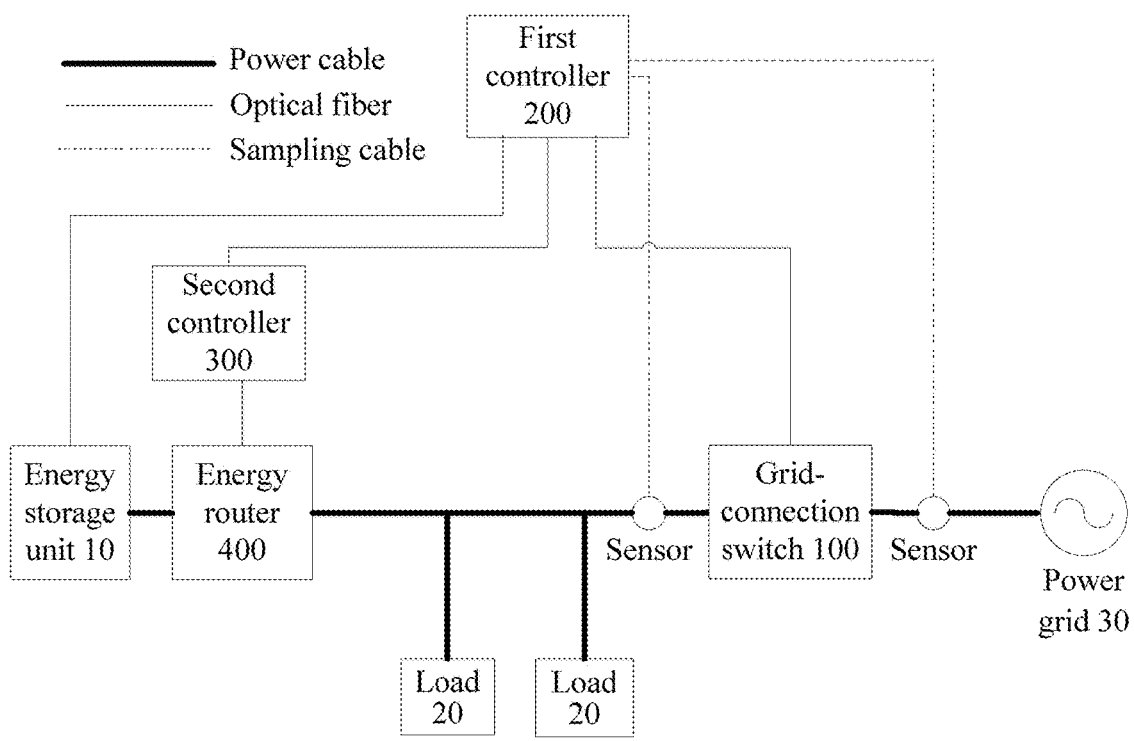
FIG. 17 is a block diagram of a microgrid system according to an embodiment of the present disclosure.

As illustrated in FIG. 17, a microgrid system is further provided according to an embodiment of the present disclosure. The microgrid system includes the control system of the microgrid as described above, the energy storage unit 10 and the load 20; the energy storage unit 10 is connected to an end of the energy router 400, and another end of the power router 400 is connected to the power grid 30 via the grid-connection switch 100; the energy router 400 supplies power to the load 20; the energy storage unit 10 and the grid-connection switch 100 are connected to the first controller 200 through an optical network; the energy router 400 is connected to the second controller 300 through an optical network, and the second controller 300 is connected to the first controller 200 through an optical network.

In a case that the microgrid is in the off-grid state, the control system of the microgrid converts a direct current of the energy storage unit 10 into an alternating current to supply power to the load 20. In a case that the microgrid is in the grid-connected state, the control system of the microgrid converts an alternating current of the power grid 30 into a direct current to charge the energy storage unit 10.

In addition, the control system of the microgrid and the microgrid according to the embodiment of the present disclosure enhance operation stability of the microgrid through hierarchical control, and achieve an ability of applying 100% unbalanced load in the off-grid state through double closed loop control of voltage and current.

Although the present disclosure is illustrated and described with reference to the exemplary embodiments, it should be understood by those skilled in the art that various changes in form and detail can be made to the present disclosure without departing from the principle and scope of the present disclosure defined by the claims.

The invention claimed is:

1. A control system of a microgrid, comprising: a grid-connection switch, an energy router, a first controller and a second controller,
   wherein:
   the first controller controls connection and disconnection of the grid-connection switch and sends a first control instruction based on a state of the control system of the microgrid;
   the second controller receives the first control instruction from the first controller and controls the energy router in response to the first control instruction;
   in a case that the grid-connection switch is disconnected, the first controller generates a first frequency regulation instruction and a first voltage regulation instruction based on an actual voltage and an actual frequency of a power grid, determines a first active power instruction and a first reactive power instruction based on a three-phase voltage of the power grid and a three-phase voltage of the microgrid, and takes the first frequency regulation instruction, the first voltage regulation instruction, the first active power instruction and the first reactive power instruction as the first control instruction; and
   the second controller is in a Virtual Synchronous Generator (VSG) control mode.

2. The control system of the microgrid according to claim 1, wherein:
   the first controller determines a voltage amplitude of the power grid and an angular frequency of the power grid, and takes the voltage amplitude of the power grid as the first voltage regulation instruction and takes the angular frequency of the power grid as the first frequency regulation instruction; and
   the second controller receives the first voltage regulation instruction and the first frequency regulation instruction, and controls the energy router in response to the first voltage regulation instruction and the first frequency regulation instruction, to make a voltage amplitude and a frequency outputted by the microgrid consistent with the voltage amplitude and the frequency outputted by the power grid.

3. The control system of the microgrid according to claim 1, wherein:
   the first controller determines a frequency of the power grid, a voltage amplitude of the power grid, a frequency of the microgrid and a voltage amplitude of the microgrid; performs Proportional Integral (PI) adjustment on a difference between the frequency of the power grid and the frequency of the micro-grid, and determines the difference after the PI adjustment as the first active power instruction; and performs PI adjustment on a difference between the voltage amplitude of the power grid and the voltage amplitude of the microgrid, and determines the difference after the PI adjustment as the first reactive power instruction; and
   the second controller receives the first active power instruction and the first reactive power instruction, and controls the energy router in response to the first active power instruction and the first reactive power instruction, to make the energy router output an active power and a reactive power that match a load.

4. The control system of the microgrid according to claim 1, wherein:
   the second controller determines an actual output active power and an actual output reactive power based on an output voltage of the energy router, and determines angles of positive sequence rotation coordinate transformation and negative sequence rotation coordinate transformation of the output voltage and an output current of the energy router by invoking a rotor motion equation and a prime mover regulation equation in combination with the actual output active power, the first active power instruction and the first frequency regulation instruction; and
   the second controller determines d axis component given value and q axis component given value of a positive sequence output voltage of the energy router based on the actual output reactive power, the first reactive power instruction and the first voltage regulation instruction, and sets d axis component given value and q axis component given value of a negative sequence output voltage of the energy route as zero.

5. The control system of the microgrid according to claim 4, wherein the second controller is configured to:
   perform positive sequence rotation coordinate transformation and negative sequence rotation coordinate transformation on the output voltage of the energy router, to obtain a positive sequence component and a negative sequence component of the output voltage;
   obtain direct current components of the positive sequence component and the negative sequence component of the output voltage by a notch filter;
   perform positive sequence rotation coordinate transformation and negative sequence rotation coordinate transformation on the output current of the energy router, to obtain a positive sequence component and a negative sequence component of the output current;
   obtain direct current components of the positive sequence component and the negative sequence component of the output current by a notch filter;
   calculate an instantaneous active power and an instantaneous reactive power of the energy router based on the direct current components of the positive sequence component and the negative sequence component of the output voltage and the direct current components of the positive sequence component and the negative sequence component of the output current; and
   pass the instantaneous active power and the instantaneous reactive power through a low pass filter to obtain the actual output active power and the actual output reactive power.

6. The control system of the microgrid according to claim 5, wherein the second controller is further configured to:
  perform PI adjustment on differences between the d axis component given value and the q axis component given value of the positive sequence output voltage and the negative sequence output voltage of the energy router and the direct current components of the positive sequence component and the negative sequence component of the output voltage, and takes the differences after the PI adjustment as a positive sequence output current component given value and a negative sequence output current component given value of the energy router; and
  determine a positive sequence output voltage component given value and a negative sequence output voltage component given value of the energy router in a static coordinate system based on the differences between the positive sequence output current component given value and the negative sequence output current component given value of the energy router and the direct current components of the positive sequence component and the negative sequence component of the output current after PI adjustment, to realize dual closed loop control of voltage and current.

7. The control system of the microgrid according to claim 6, wherein:
  the second controller detects odd harmonics in the output voltage of the energy router, and determines a direct current component of each of the harmonic voltages, perform PI adjustment on a difference between the direct current component of each of the harmonic voltages and zero, and perform inverse transformation on the difference after the PI adjustment to obtain a given value of each of the harmonic voltages.

8. The control system of the microgrid according to claim 7, wherein:
  the second controller obtains a feedforward amount of the output voltage by performing a static coordinate transformation on the output voltage of the energy router, and generates a modulated wave by invoking an Space Vector Pulse Width Modulation (SVPWM) modulation wave generation function in combination with a sum of the positive sequence output voltage component given value and the negative sequence output voltage component given value in the static coordinate system, the given value of each of the harmonic voltages and the feedforward amount of the output voltage, to control operation of the energy router.

9. The control system of the microgrid according to claim 4, wherein:
  the second controller adds the first voltage regulation instruction to an output of a reactive power deviation regulation by invoking a ramp function.

10. The control system of the microgrid according to claim 1, wherein:
  in a case that the grid-connection switch is disconnected, the first controller determines a voltage amplitude of a power grid, a voltage phase of the power grid, a voltage phase of the microgrid and an angular frequency of the microgrid, and detects whether a difference between the voltage phase of the power grid and the voltage phase of the microgrid reaches a predetermined threshold; and
  the first controller controls the grid-connection switch to be connected if detecting that the difference reaches the predetermined threshold.

11. The control system of the microgrid according to claim 10, wherein:
  the first controller superimposes a predetermined multiple of the difference onto the angular frequency of the microgrid to obtain a second frequency regulation instruction, and takes the voltage amplitude of the power grid as the second voltage regulation instruction, and further determines a second active power instruction and a second reactive power instruction that match a load, and then takes the second frequency regulation instruction, the second voltage regulation instruction, the second active power instruction and the second reactive power instruction as the first control instruction.

12. The control system of the microgrid according to claim 1, wherein:
  in a case that the grid-connection switch is connected, the first controller generates a second active power instruction and a second reactive power instruction, as the first control instruction, based on a power of a load and a state of an energy storage unit; and
  wherein the second controller is in an active and reactive (PQ) control mode.

13. The control system of the microgrid according to claim 12, wherein:
  the second controller determines a positive sequence output voltage component given value and a negative sequence output voltage component given value in a static coordinate system based on a positive sequence output current component given value and a negative sequence output current component given value of the energy router and direct current components of a positive sequence component and a negative sequence component of an output current of the energy router, and generates a modulated wave by invoking an Space Vector Pulse Width Modulation (SVPWM) modulation wave generation function in combination with a sum of a positive sequence output voltage component given value and a negative sequence output voltage component given value in the static coordinate system and a feedforward amount of an output voltage of the energy router, to control operation of the energy router.

14. The control system of the microgrid according to claim 1, wherein:
  in a case that the grid-connection switch is connected, the first controller controls the grid-connection switch to be disconnected if detecting that a current flowing through the grid-connection switch reaches a predetermined current threshold.

15. The control system of the microgrid according to claim 14, wherein;
  the first controller generates a second active power instruction and a second reactive power instruction according to the current flowing through the grid-connection switch, and then takes the second active power instruction and the second reactive power instruction as the first control instruction.

16. The control system of the microgrid according to claim 1, wherein:
  the first controller controls the grid-connection switch to be disconnected if detecting a power grid fault under a grid-connected state of the control system of the microgrid.

17. The control system of the microgrid according to claim 1, wherein:
  the second controller comprises a digital signal processor, and wherein the second controller is configured to be in a VSG control mode when the digital signal processor runs a VSG algorithm and be in an active and reactive (PQ) control mode when the digital signal processor runs a PQ algorithm.

18. A microgrid, comprising: the control system of the microgrid according to claim 1, an energy storage unit and a load, wherein:

the energy storage unit is connected to an end of the energy router, and the other end of the energy router is connected to a power grid via the grid-connection switch; the energy router supplies power to the load;

the energy storage unit and the grid-connection switch are connected to the first controller via an optical network;

the energy router is connected to the second controller via an optical network, and the second controller is connected to the first controller via an optical network;

in a case that the microgrid system is in an off-grid state, the control system of the microgrid converts a direct current of the energy storage unit into an alternating current, for supplying to the load; and in a case that the microgrid system is in a grid-connected state, the control system of the microgrid converts an alternating current of the power grid into a direct current, for charging the energy storage unit.

* * * * *